US012142827B2

(12) United States Patent
Yamada et al.

(10) Patent No.: US 12,142,827 B2
(45) Date of Patent: Nov. 12, 2024

(54) ANTENNA MODULE, COMMUNICATION DEVICE MOUNTED WITH THE SAME, AND CIRCUIT BOARD

(71) Applicant: Murata Manufacturing Co., Ltd., Nagaokakyo (JP)

(72) Inventors: Yoshiki Yamada, Nagaokakyo (JP); Kengo Onaka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 412 days.

(21) Appl. No.: 17/703,984

(22) Filed: Mar. 25, 2022

(65) Prior Publication Data

US 2022/0216605 A1 Jul. 7, 2022

Related U.S. Application Data

(63) Continuation of application No. PCT/JP2020/026388, filed on Jul. 6, 2020.

(30) Foreign Application Priority Data

Sep. 27, 2019 (JP) ................................ 2019-177383

(51) Int. Cl.
*H01Q 1/48* (2006.01)
*H01Q 5/307* (2015.01)

(52) U.S. Cl.
CPC ............... *H01Q 1/48* (2013.01); *H01Q 5/307* (2015.01)

(58) Field of Classification Search
CPC ........ H01Q 1/48; H01Q 5/307; H01Q 9/0407; H01Q 19/185; H01Q 21/08; H01Q 21/28;
(Continued)

(56) References Cited

U.S. PATENT DOCUMENTS

2015/0214625 A1* 7/2015 Sawa .................. H01Q 9/0414 343/700 MS
2015/0315397 A1* 11/2015 Toyoda ................ B41J 2/04573 347/100

(Continued)

FOREIGN PATENT DOCUMENTS

CN 109546326 A 3/2019
CN 110224222 A 9/2019

(Continued)

OTHER PUBLICATIONS

International Search Report and Written Opinion mailed on Sep. 24, 2020, received for PCT Application PCT/ JP2020/026388, Filed on Jul. 6, 2020, 11 pages including English Translation.

(Continued)

*Primary Examiner* — David E Lotter
(74) *Attorney, Agent, or Firm* — XSENSUS LLP

(57) ABSTRACT

An antenna module includes a dielectric substrate including a plurality of dielectric layers that are laminated, and a radiation element, a ground electrode, and peripheral electrodes that are formed in or on the dielectric substrate. The radiation element radiates radio waves in a first polarization direction. The ground electrode is placed so as to face the radiation element. The peripheral electrodes are formed in a plurality of layers between the radiation element and the ground electrode and are electrically connected to the ground electrode. The peripheral electrodes are placed at positions that are symmetrical with respect to at least either of a first direction parallel to the first polarization direction and a second direction orthogonal to the first polarization direction.

20 Claims, 18 Drawing Sheets

(58) Field of Classification Search
CPC ...... H01Q 1/2283; H01Q 13/08; H01Q 21/06; H01Q 1/38
See application file for complete search history.

(56) References Cited

U.S. PATENT DOCUMENTS

| | | | |
|---|---|---|---|
| 2016/0315397 | A1 | 10/2016 | Sawa |
| 2019/0098750 | A1 | 3/2019 | Woo |

FOREIGN PATENT DOCUMENTS

| | | | |
|---|---|---|---|
| JP | 2018-148290 | A | 9/2018 |
| WO | 2016/153459 | A1 | 9/2016 |

OTHER PUBLICATIONS

Chinese Office Action issued Jul. 18, 2022, in Chinese Application No. 202080067617.9.
Office Action issued Dec. 7, 2022 in German Patent Application No. 11 2020 003 999.4, 6 pages.
Chinese Office Action issued Dec. 21, 2022, in corresponding Chinese Patent Application 202080067617.9, 9pp.

* cited by examiner

ANTENNA MODULE, COMMUNICATION DEVICE MOUNTED WITH THE SAME, AND CIRCUIT BOARD

CROSS-REFERENCE TO RELATED APPLICATIONS

The present application is a continuation application of International Patent Application No. PCT/JP2020/026388, filed Jul. 6, 2020, which claims priority to Japanese Patent Application No. 2019-177383, filed Sep. 27, 2019, the entire contents of each of which being incorporated herein by reference.

TECHNICAL FIELD

The present disclosure relates to an antenna module and a communication device mounted with the antenna module and more particularly to a structure of an antenna module that improves antenna characteristics.

BACKGROUND ART

In Japanese Unexamined Patent Application Publication No. 2018-148290 (Patent Document 1), an antenna device in which a plurality of tabular radiation elements (patch antennas) are formed on a rectangular substrate is disclosed.

In such patch antennas as disclosed in Patent Document 1, a tabular ground electrode is provided so as to face the radiation elements and radio waves are radiated by way of electromagnetic field coupling between the radiation elements and the ground electrode.

CITATION LIST

Patent Document

Patent Document 1: Japanese Unexamined Patent Application Publication No. 2018-148290

SUMMARY

Technical Problems

Such an antenna device as disclosed in Japanese Unexamined Patent Application Publication No. 2018-148290 (Patent Document 1) is used in a portable terminal such as a cellular phone or a smartphone, for instance. For such a portable terminal, there are still great demands for reduction in size and thickness and further reduction in size of an antenna device built in the portable terminal is required accordingly. In recent years, particularly, there has been a tendency in which a region in a casing where the antenna device can be placed is restricted with enlargement of screens of smartphones and thus the antenna device may be placed in a narrow region on a side face of the casing, for instance.

In order to attain desired antenna characteristics in a patch antenna, ideally, it is necessary to provide a ground electrode having a sufficiently large area, compared with a radiation element. In case where the antenna device is placed in such a restricted narrow region as described above, however, it may be impossible to ensure the sufficiently large area of the ground electrode, compared with the radiation element. Meanwhile, it may be impossible to attain a symmetrical shape of the ground electrode, depending on an installation site of the antenna device or positional relation thereof with peripheral instruments. There is a fear, as recognized by the present inventors, that such restrictions on the size and shape of the ground electrode may cause turbulence of electric lines of force between the radiation elements and the ground electrode and may influence antenna characteristics such as gain, frequency band, or directivity.

The present disclosure has been made in order to solve such problems, as well as other problems, and aims at maintaining satisfactory antenna characteristics in an antenna module in which a patch antenna is formed and in which the size and/or shape of the ground electrode is restricted.

Solutions to the Problems

An antenna module according to a first aspect of the present disclosure includes a dielectric substrate including a plurality of dielectric layers that are laminated, and a radiation element, a ground electrode, and peripheral electrodes that are disposed in or on the dielectric substrate. The radiation element is configured to radiate radio waves in a first polarization direction. The ground electrode is positioned so as to face the radiation element. The peripheral electrodes are arranged in a plurality of layers between the radiation element and the ground electrode and are electrically connected to the ground electrode. The peripheral electrodes are symmetrically positioned with respect to at least one of a first direction parallel to the first polarization direction or a second direction orthogonal to the first polarization direction.

An antenna module according to a second aspect of the present disclosure includes a dielectric substrate including a plurality of dielectric layers that are laminated, and a first radiation element, a second radiation element, a ground electrode, and peripheral electrodes that are disposed in or on the dielectric substrate. The first radiation element and the second radiation element are positioned so as to adjoin each other. The ground electrode is positioned so as to face the first radiation element, and the second radiation element. The peripheral electrodes are arranged in a plurality of layers between the first radiation element and the ground electrode and a plurality of layers between the second radiation element and the ground electrode and are electrically connected to the ground electrode. The peripheral electrodes are symmetrically positioned with respect to at least one of a first direction parallel to a polarization direction of radiated radio waves or a second direction orthogonal to the polarization direction, for each of the first, radiation element and the second radiation element.

A circuit board according to a third aspect of the present disclosure is a device to feed radio frequency signals to a radiation element and includes a dielectric substrate including a plurality of dielectric layers that, are laminated, a ground electrode, and peripheral electrodes. The radiation element radiates radio waves in a first polarization direction. The ground electrode is positioned to face the radiation element. The peripheral electrodes are arranged in a plurality of layers between the radiation element and the ground electrode and are electrically connected to the ground electrode. The peripheral electrodes are symmetrically positioned with respect to at least one of a first direction parallel to the first polarization direction or a second direction orthogonal to the first polarization direction.

Advantageous Effects

In the antenna module and the circuit board according to the present disclosure, the peripheral electrodes electrically connected to the ground electrode are placed in the plurality of layers of the dielectric substrate between the radiation element and the ground electrode. Further, the peripheral electrodes are placed at the positions that are symmetrical with respect to at least either of the first direction parallel to the polarization direction of the radiation element and the second direction orthogonal to the first direction. By the placement of the peripheral electrodes at the positions that are symmetrical with respect to the radiation element, the electric lines of force generated in the radiation element can be homogenized in this manner and therefore the deterioration in the antenna characteristics on condition that the size and/or shape of the ground electrode is restricted can be suppressed.

DESCRIPTION OF EMBODIMENTS

Figure 1:
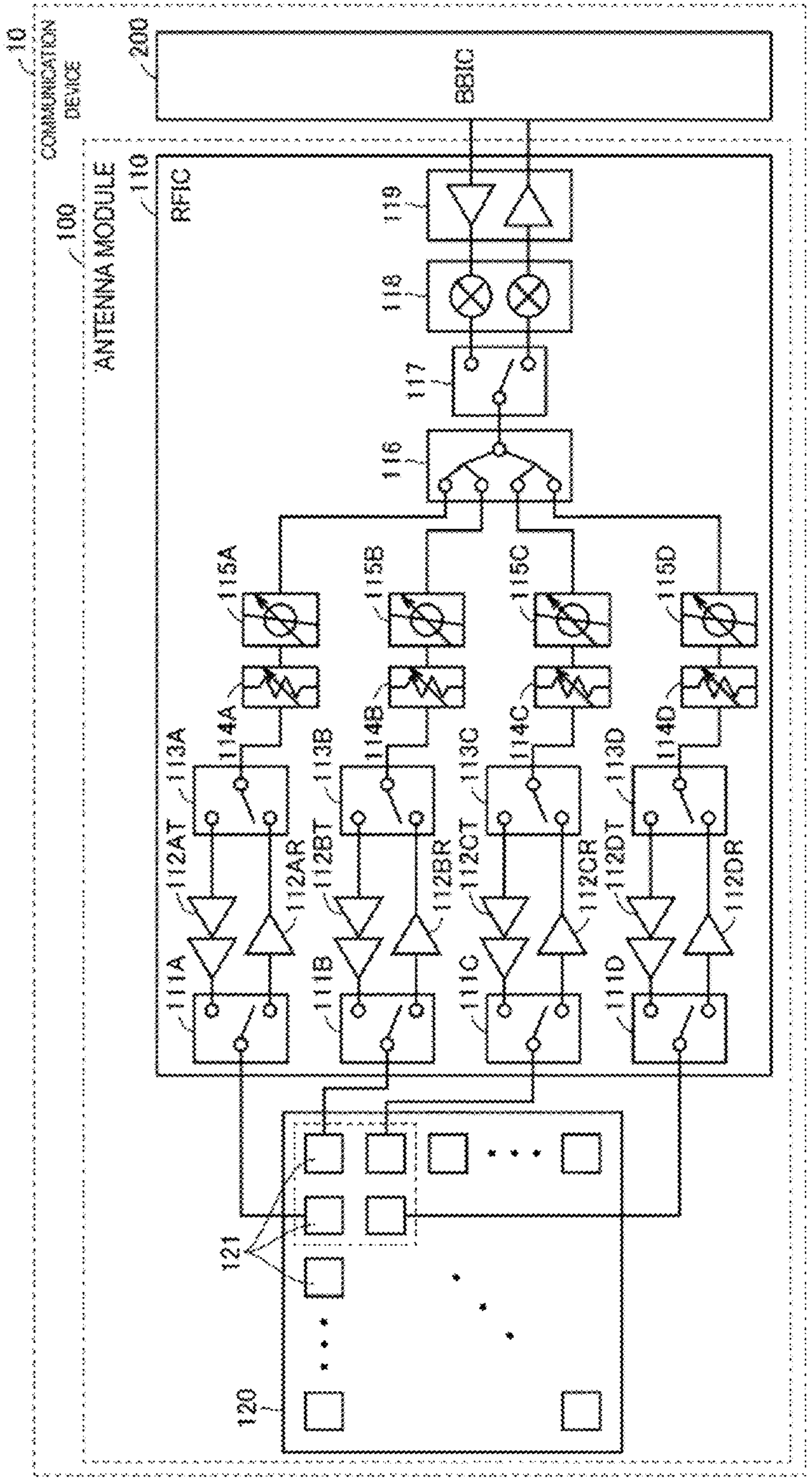
FIG. 1 is a block diagram illustrating a communication device to which an antenna module according to Embodiment 1 is applied.

Hereinbelow, embodiments of the present disclosure will be described in detail with reference to the drawings. In the drawings, identical components or corresponding components are provided with identical reference characters and description thereof will not be iterated.

Embodiment 1

(Basic Configuration of Communication Device)

FIG. 1 is an example of a block diagram illustrating a communication device 10 to which an antenna module 100 according to Embodiment 1 is applied. The communication device 10 is a portable terminal such as a cellular phone, a smartphone, or a tablet, a personal computer having a communication function, or the like, for instance. An example of a frequency band of radio waves to be used for the antenna module 100 according to the present embodiment is a millimeter waveband with a center frequency of 28 GHz, 39 GHz, 60 GHz, or the like, for instance, whereas application to radio waves of frequency bands other than the above may be made as well.

In reference to FIG. 1, the communication device 10 includes the antenna module 100 and a baseband integrated circuit (BBIC) 200 that forms a baseband signal processing circuit. The antenna module 100 includes a radio-frequency integrated circuit (RFIC) 110 as an example of a feed circuit and an antenna device 120. The circuity of the communication device 10 up-converts signals, transferred from the BBIC 200 to the antenna module 100, into radio frequency (RF) signals in the RFIC 110 and radiates the signals from the antenna device 120. Additionally, the communication device 10 conveys radio frequency signals received by the antenna device 120 to the RFIC 110, which then down-converts the RF signals before processing them in the BBIC 200.

In FIG. 1, for facilitation of description, only configurations corresponding to four feed elements 121 among a plurality of feed elements (radiation elements) 121 that form the antenna device 120 are illustrated and configurations corresponding to the other feed elements 121 that, have a similar configuration are omitted. Though an example in which the antenna device 120 is formed of the plurality of feed elements 121 arranged, in shape of a two-dimensional array is illustrated in FIG. 1, a one-dimensional array in which the plurality of feed elements 121 are arranged in a line may be used. The antenna device 120 may also have a configuration in which a single feed element 121 is provided. In the embodiment, the feed elements 121 are patch antennas having tabular shapes (i.e., flat or planar, like a table-top).

The RFIC 110 includes switches 111A to HID, 113A to 113D, and 117, power amplifiers 112AT to 112DT, low-noise amplifiers 112/AR to 112DR, attenuators 114A to 114D, phase shifters 115A to 115D, a signal synthesizer/branching filter 116, a mixer 118, and an amplifier circuit 119.

For transmission of the radio frequency signals, the switches 111A to 111D and 113A to 113D are switched to states that select the power amplifiers 112AT to 112D7 and the switch 117 is connected to a transmitting-side amplifier in the amplifier circuit 119. For reception of the radio frequency signals, the switches 111A to HID and 113A to 113D are switched to states that select the low-noise amplifiers 112AR to 112DR and the switch 117 is connected to a receiving-side amplifier in the amplifier circuit 119.

The signals transferred from the BBIC 200 are amplified by the amplifier circuit 119 and are up-converted by the mixer 118. Transmission signals that are the up-converted radio frequency signals are branched into four parts by the signal synthesizer/branching filter 116, are passed through four signal paths, and are respectively fed into the different feed elements 121. Then, directivity of the antenna device 120 can be adjusted via individual phase adjustments made by the phase shifters 115A to 115D provided respectively in the signal paths.

Reception signals that are the radio frequency signals received by the feed elements 121 are respectively passed through the four different signal paths and are multiplexed by the signal synthesizer/branching filter 116. The multiplexed reception signals are down-converted by the mixer 118, are amplified by the amplifier circuit 119, and are transferred to the BBIC 200.

The RFIC 110 is formed as a one-chip integrated-circuit component including an above-described circuit configuration, for instance. Alternatively, circuitry components (switch, power amplifier, low-noise amplifier, attenuator, and phase shifter) corresponding to each of the feed elements 121 in the RFIC 110 may be separately, or in sub groups, formed as one-chip integrated-circuit component for the corresponding feed element 121.

First Example

Figure 2:
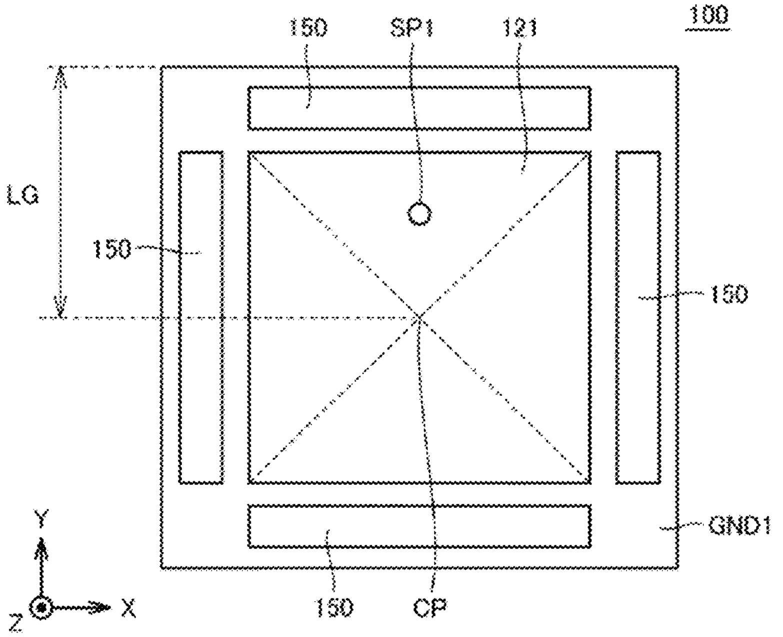
FIG. 2 is a plan view of a first example of the antenna module according to Embodiment 1.
Figure 3:
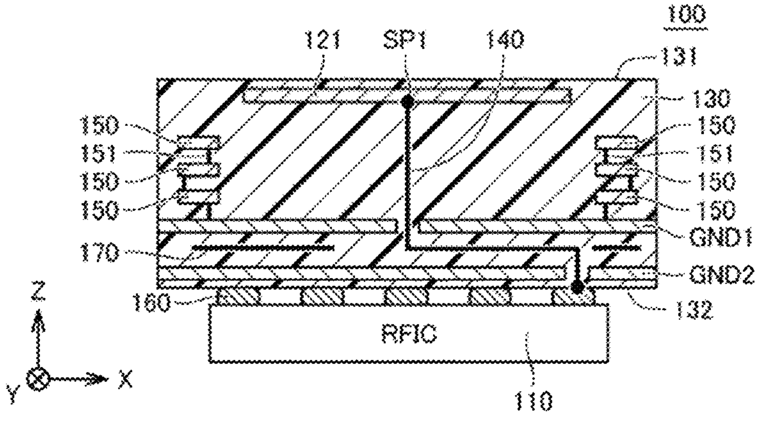
FIG. 3 is a perspective side view of the antenna module of FIG. 2.

With reference to FIG. 2 and FIG. 3, details of a configuration of the antenna module according to Embodiment 1 will be described. FIG. 2 is a plan view of a first example of the antenna module 100 of Embodiment 1. FIG. 3 is a perspective side view of the antenna module 100. In the plan view of FIG. 2, dielectric layers are omitted so that inner electrodes may be seen.

In reference to FIG. 2 and FIG. 3, the antenna module 100 includes a dielectric substrate 130, feeder wiring 140 (the term "wiring" is used broadly to mean provide a conductive path), peripheral electrodes 150, and ground electrodes GND1 and GND2, in addition to the feed element 121 and the RFIC 110. In following description, a normal direction (radiation direction of radio waves) with respect to the dielectric substrate 130 is defined as the Z-axis direction and a plane perpendicular to the Z-axis direction is defined by the X axis and the Y axis. In the drawings, a positive direction along the Z axis may be referred to as upside and a negative direction may be referred to as downside.

The dielectric substrate 130 is a low temperature co-fired ceramics (LTCC) multilayer substrate, a multilayer resin substrate that is formed of a lamination of a plurality of resin layers made of resin such as epoxy or polyimide, a multilayer resin substrate that is formed of a lamination of a plurality of resin layers made of liquid crystal polymer (LCP) having a lower permittivity, a multilayer resin substrate that is formed of a lamination of a plurality of resin layers made of fluorine-based resin, or a ceramics multilayer substrate other than LTCC, for instance.

The dielectric substrate 130 has a substantially rectangular shape arid has the feed element 121 placed in a layer (upside layer) near to a top surface 131 (surface facing in the positive direction along the Z axis) thereof. The feed element 121 may be embodied so as to be exposed on a surface of the dielectric substrate 130 or may be placed within an inner layer in the dielectric substrate 13C as shown in the example of FIG. 3. Though the example in which only the feed elements are used as radiation elements is described as Embodiment 1 for facilitation of description, a configuration in which passive elements and/or parasitic elements are provided in addition to the feed elements may be adopted.

In a layer (downside layer) closer to a bottom surface 132 (surface facing in the negative direction along the Z axis) than the feed element 121 in the dielectric substrate 130, the tabular (or flat) ground electrode GND2 is placed so as to face the feed element 121. The ground electrode GND1 is placed in a layer between the feed element 121 and the ground electrode GND2.

A layer between the ground electrode GND1 and the ground electrode GND2 is used as a wiring region. In the wiring region, a wiring pattern 170 is placed, the wiring pattern 170 forming the feeder wiring to feed the radio frequency signals to the radiation element, stubs and filters to be connected to the feeder wiring, connection wiring to be connected to other electronic components, and the like. Once again "wiring" should be construed and a one or more electrically conductive paths, and not necessarily a "wire" of any particular gauge. Unnecessary coupling between the feed element 121 and the wiring pattern 170 can be suppressed by formation of the wiring region in the dielectric layer opposed to the feed element 121 with respect to the ground electrode GND1 in this manner.

Below the bottom surface 132 of the dielectric substrate 130, the RFIC 110 is mounted with solder bumps 100 interposed therebetween. The RFIC 110 may be connected to the dielectric substrate 130 with use of multi-pole connectors instead of solder connection.

The radio frequency signals are fed from the RFIC 110 through the feeder wiring 140 to a feeding point SP1 of the feed element 121. The feeder wiring 140 rises from the RFIC 110 through the ground electrode GND2 and extends in the wiring region. Further, the feeder wiring 140 rises from immediately below the feed element 121 through the ground electrode GND1 and is connected to the feeding point SRI of the feed element 121.

In the example structure of FIG. 2 and FIG. 3, the feeding point SP1 of the feed element 121 is placed at a position offset from a center of the feed element. 121 in a positive direction along the Y axis. With placement of the feeding point SP1 at such a position, radio waves having a polarization direction along the Y axis are radiated from the feed element 121.

The peripheral electrodes 150 are formed in end portions of the dielectric substrate 130 and in a plurality of dielectric layers between the feed element 121 and the ground electrode GND1. In the antenna module 100, the peripheral electrodes 150 are placed along sides of the rectangular feed element 121 in plan view from the normal direction (positive direction along the Z axis) with respect to the dielectric substrate 130. The peripheral electrodes 150 placed along the sides are placed at positions that are symmetrical with respect to the polarization direction (Y-axis direction) of the feed element 121 and a direction (X-axis direction) orthogonal to the polarization direction.

In plan view of the dielectric substrate 130, the peripheral electrodes 150 are placed 30 as to be overlaid in a direction of the lamination (i.e., a footprint of one peripheral electrode 150 at least partially overlaps ail others). That is, the peripheral electrodes 150 form a virtual conductor wall along the sides of the dielectric substrate 130. The peripheral electrodes 150 adjoining in the direction of the lamination are electrically connected to each other by connecting conductors 151, sometimes referred to as vias 151. In this context, a "via" is a vertical structure extending between peripheral electrodes 150 and may be provided with an electrically conductive material so as to make an electrical connection between them. In this context the term "via" is a connecting conductor. Further, the peripheral electrodes 150 at bottom are electrically connected to the ground electrode GND1 by the connecting conductors 151. That is, the peripheral electrodes 150 substantially have a configuration equivalent to a configuration in which end portions of the ground electrode GND1 are extended in the direction of the lamination. Incidentally, the peripheral electrodes 150 need not have an identical shape, and respective sizes of the electrodes may be increased with approximation to the ground electrode GND1 in the direction of the lamination of the dielectric substrate 130, for instance.

In the antenna module 100, the connecting conductors 151 formed in the dielectric layers adjoining in the direction of the lamination are preferably placed so that successive connecting conductors 151 do not to overlap in plan view from the normal direction with respect to the dielectric substrate 130. Moreover, as seen from a side view, cross-section, a set of connecting conductors 151 are staggered so a first connecting conductor 151 is on a first side, a next connecting conductor 151 is on the other side, and then the next connecting conductor 151 after that is on the first side, and so on. Electrical conducting material (copper, typically) forming the connecting conductors 151 exhibits smaller compressibility than dielectric material, when being pressurized. Therefore, when the dielectric substrate 130 is pressed for pressure bonding of the dielectric layers in case where all the connecting conductors 151 in the layers are placed at the same positions in plan view from the normal direction with respect to the dielectric substrate 130, portions made of the connecting conductors 151 exhibit a smaller rate of decrease in thickness, compared with other dielectric portions, which may cause a variation in thickness in the entire dielectric substrate 130. Thus accuracy in thickness of the dielectric substrate 130 having undergone forming can be increased by placement of the connecting conductors 151 in the dielectric layers adjoining in the direction of the lamination in different positions as described above.

Electrical connections between the peripheral electrodes 150 themselves, and between the peripheral electrodes 150 and the ground electrode GND1 are not limited to direct connections through the connecting conductors 151 and may include a configuration in which some or all of the connections are attained by capacitance coupling.

From a patch antenna including such a tabular radiation element, radio waves are radiated by way of electromagnetic field coupling between the radiation element and the ground electrode. In order to attain desired antenna characteristics, the ground electrode has a sufficiently large area, compared with the radiation element.

On the other hand, for portable terminals such as cellular phones or smartphones in which patch antennas are used, there are still great demands for reduction in size and thickness, so that further reduction in size of antenna devices built in the portable terminals is required.

In a situation where the antenna device is placed in a limited space in a casing, however, it may be impossible to ensure the sufficiently large area of the ground electrode, compared with the radiation element. Meanwhile, it may be impossible to attain a symmetrical shape of the ground electrode, depending on an installation site of the antenna device or positional relation thereof with peripheral instruments. There is a concern that such restrictions on the size and shape of the ground electrode may cause turbulence of electric lines of force between the radiation element and the ground electrode and may influence the antenna characteristics such as gain, frequency band, or directivity.

Figure 4:
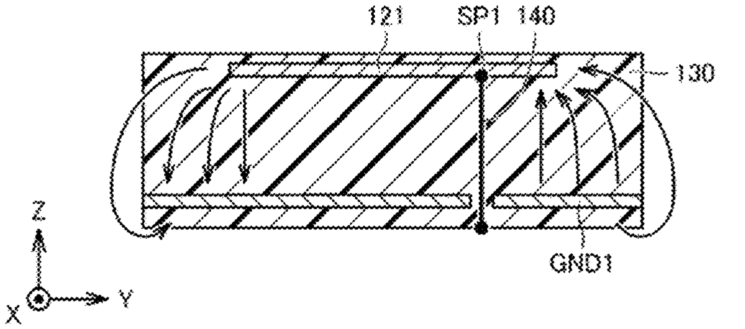
FIG. 4 is a diagram for illustration of a state of electric lines of force between a radiation element and a ground electrode on condition that no peripheral electrodes are provided.

FIG. 4 is a diagram for illustration of a state of the electric lines of force (electric field lines) between the radiation element and the ground electrode in case where a sufficient area of the ground electrode cannot be ensured, compared with the radiation element. When radio frequency signals are fed to the feed element 121 (radiation element), the electromagnetic field coupling is brought about between end portions of the feed element 121 and the ground electrode GND1. Then electric lines of force are emitted from one end portion of the feed element 121 to the ground electrode GND1 and the other end portion receives electric lines of force from the ground electrode GND1.

In a case where the ground electrode GND1 has a sufficiently large area compared with the feed element 121, electric lines of force are given and received on a surface of the ground electrode GND1 facing the feed element 121. In case where the sufficient area of the ground electrode GND1 cannot be ensured, however, a portion of the electric lines of force may go around onto a back surface of the ground electrode GND1, as illustrated in FIG. 4. In such a case, increase in a proportion of radio waves radiated to a back surface side of the antenna device may cause deterioration in antenna gain in a desired direction due to a disturbance in the directivity, decrease in a frequency bandwidth, or variation in the polarization direction, like circular polarization.

Figure 5:
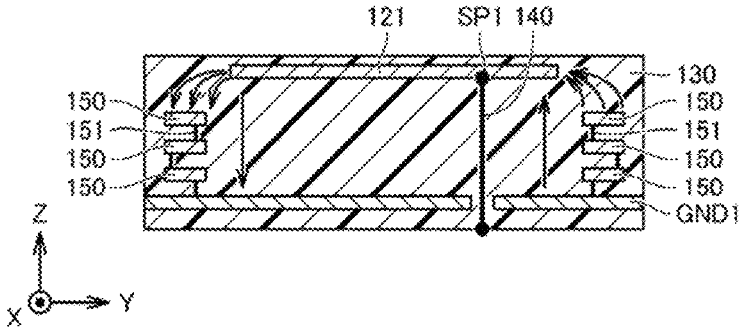
FIG. 5 is a diagram for illustration of a state of the electric lines of force between the radiation element and the ground electrode on condition that peripheral electrodes are provided.

In the antenna module 100 of Embodiment 1, the peripheral electrodes 150 electrically connected to the ground electrode GND1 are placed in the layers between the feed element 121 and the ground electrode GND1, as in FIG. 5. Distances between the peripheral electrodes 150 and the feed element 121 are shorter than a distance between the ground electrode GND1 and the feed element 121 and thus the peripheral electrodes 150 are higher in degree of the electromagnetic field coupling with the feed element 121 than the ground electrode GND1. Accordingly, the electric lines of force that, would otherwise go around onto the back surface side of the ground electrode GND1 in FIG. 4 are generated toward and from the peripheral electrodes 150 in FIG. 5. Thus radiation of radio waves to the back surface side of the antenna device is suppressed, so that the deterioration in the antenna characteristics such as gain can be suppressed.

The peripheral electrodes 150 are placed at positions that are symmetrical with respect to the polarization direction of the radio waves and/or the direction orthogonal to the polarization direction. Thus symmetry of the electric lines of force generated between the feed element 121 and the ground electrode GND1 can be improved, so that the variation in the polarization direction can be suppressed.

With a free space wavelength of the radio waves radiated from the feed element 121 defined as $\lambda_o$, the peripheral electrodes 150 are preferably provided on condition that a length (distance LG in FIG. 2) from a surface center CP of the feed element 121 to an end portion of the ground electrode GND1 along the polarization direction is smaller than $\lambda_o/2$.

Second Example

Figure 6:
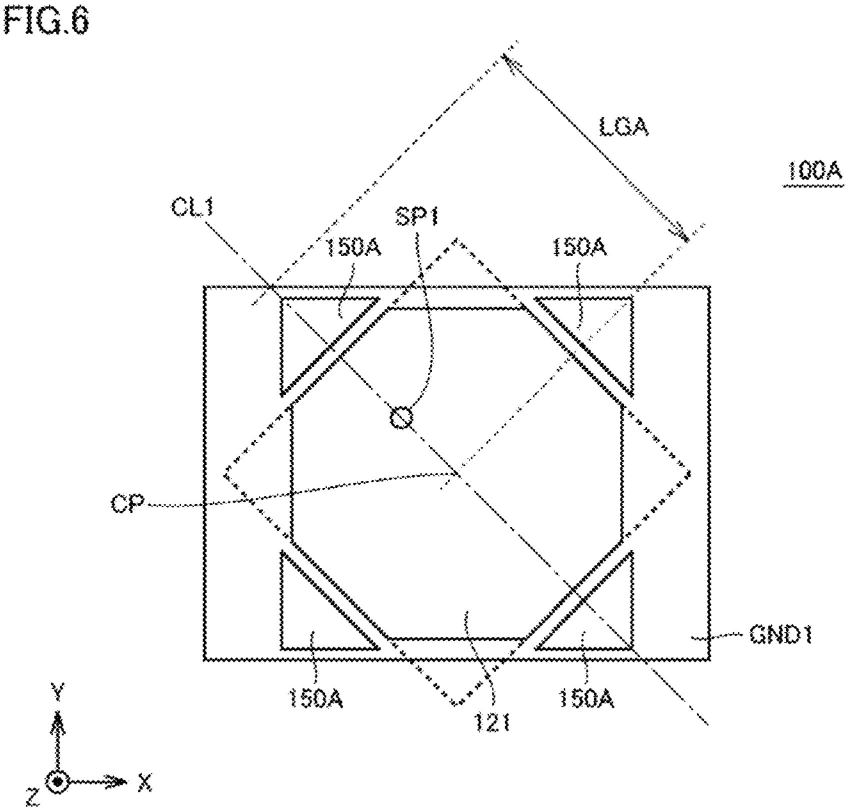
FIG. 6 is a plan view of a second example of the antenna module according to Embodiment 1.
Figure 7:
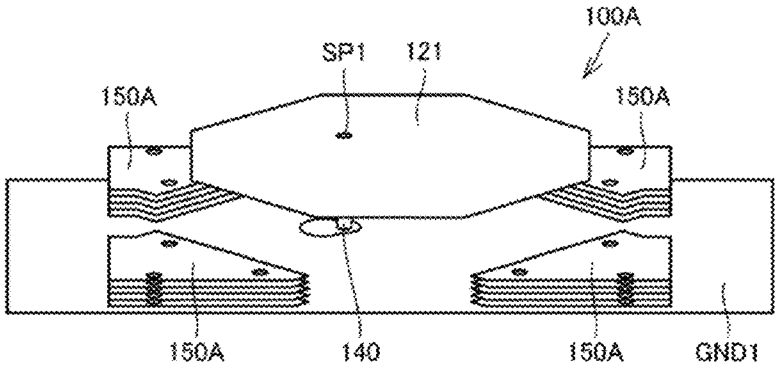
FIG. 7 is a perspective view of the antenna module of FIG. 6.

FIG. 6 and FIG. 7 are diagrams illustrating a second example of the antenna module according to Embodiment 1. FIG. 6 is a plan view of an antenna module 100A and FIG. 7 is a perspective view of the antenna module 100A. In FIG. 6 and FIG. 7 as well, the dielectric layers are omitted for facilitation of description.

The antenna module 100A of FIG. 6 is an example in which the sizes of the ground electrodes are further restricted compared with the antenna module 100 of FIG. 2 and intervals between the end portions of the feed element 121 and the end portions of the ground electrode GND1 in plan view are further narrowed on condition that the feed element 121 is placed as in the antenna module 100.

Therefore, the antenna module 100A has a configuration in which the feed element 121 is placed with a tilt of 45° around the Z axis with the surface center CP of the feed element 121 as the center in order that the distances from the surface center CP of the feed element 121 to the end portions of the ground electrode GND1 in the polarization direction may be ensured so as to be as long as possible. That is, the feeding point SP1 is placed at a position offset from the surface center CP of the feed element 121 by equal distances in the negative direction along the X axis and the positive direction along the Y axis. In the antenna module 100A, therefore, the polarization direction is a direction (direction along a chain line CL1 in FIG. 6) that results from 45° tilting of the positive direction along the Y axis in the negative direction along the X axis. Such placement of the feed element 121 enables ensuring of the intervals between the end portions of the teed element 121 and the end portions of the ground electrode GND1 in plan view and suppression of the decrease in the frequency band width.

In the antenna module 100A, the feed element 121 is made to protrude from an extent of the ground electrode GND1 (that is, an extent of the dielectric substrate 130) as a result of the tilting of the feed element 121 and thus four corner portions of the square feed element 121 are cut off so that the feed element 121 is substantially shaped like an octagon.

In the antenna module 100A, peripheral electrodes 150A that are substantially shaped like right triangles are placed along sides of the feed element 121 that extend along the polarization direction and sides thereof that are orthogonal to the polarization direction and in layers between the feed element 121 and the ground electrode GND1. The peripheral electrodes 150A are placed so as to have hypotenuses facing in a first direction parallel to the polarization direction or in a second direction orthogonal to the polarization direction. Such placement of the peripheral electrodes 150A at positions that are symmetrical with respect to the polarization direction of the radio waves and/or the direction orthogonal to the polarization direction increases the degree of the coupling between the feed element 121 and the ground electrode GND1 and improves the symmetry of electric lines of force generated between the feed element 121 and the ground electrode GND1, so that the deterioration in the antenna characteristics can be suppressed.

Though the peripheral electrodes 150A substantially shaped like the right triangle are illustrated in FIG. 6 and FIG. 7, the peripheral electrodes may be in a shape of a triangle other than a right triangle or may be rectangular as in FIG. 2. It is preferable that a size of the peripheral electrodes 150A should be greater than or equal to a length of a facing side of the feed element 121. With the free space wavelength of radio waves radiated from the feed element 121 defined as $\lambda_o$, the peripheral electrodes 150A are preferably provided on condition that a length (distance LGA in FIG. 6) from the surface center CP of the feed element 121 to an end portion of the ground electrode GND1 along the polarization direction (direction along the chain line CL1 in FIG. 6) is smaller than $\lambda_o/2$.

(Comparison of Antenna Characteristics)

Figure 8:
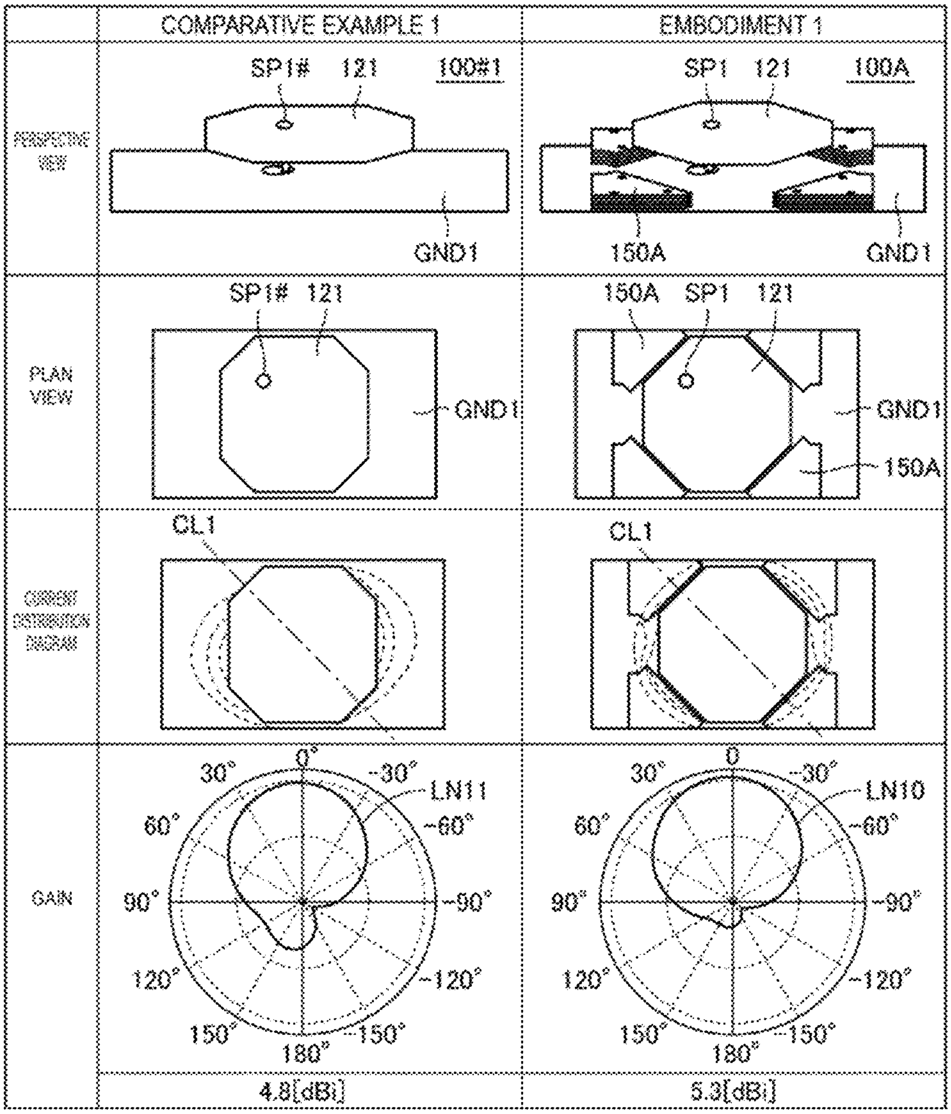
FIG. 8 is a diagram for illustration of antenna characteristics in accordance with presence or absence of the peripheral electrodes.

With use of FIG. 8, antenna characteristics in accordance with presence or absence of the peripheral electrodes will be described. In FIG. 8, results of simulations with a configuration of the antenna module 100A of the second example illustrated in FIG. 6 and Comparative example 1 including no peripheral electrodes are illustrated. In FIG. 8, perspective views of antenna modules, plan views thereof, current distribution diagrams concerning the ground electrode, and antenna gains are illustrated in descending order from top. In the current distribution diagrams, contour lines each denoting currents with an identical strength are illustrated as dashed lines. In the antenna gains, peak gains with angles from the radiation direction (Z-axis direction) are illustrated on an X-Y plane having an origin at the surface center of the feed element 121.

In an antenna module 100#1 of Comparative example 1, in reference to FIG. 8, placement of the feed element 121 and the ground electrode GND1 is similar to the antenna module 100A, whereas the peripheral electrodes 150A are not provided. Therefore, a portion of electric lines of force may go around onto the back, surface of the ground electrode GND1 in the antenna module 100#1 of Comparative example 1. In the antenna module 100#1 of Comparative example 1, accordingly, the gains on the back surface side (between 120° and 180°, in particular) are increased and a peak gain in total is 4.8 [dBi]. In the antenna module 100A including the peripheral electrodes 150A, by contrast, the gains on the back surface side are decreased and the peak gain in total is improved to 5.3 [dBi]. That is, it is observed that, the electric lines of force which go around onto the back surface side are suppressed by the peripheral electrodes 150A.

In both of the antenna module 100A and the antenna module 100#1 of Comparative example 1, a dimension of the ground electrode GND1 along the Y-axis direction is smaller than a dimension thereof along the X-axis direction and a shape of the ground electrode is asymmetrical with respect to the polarization direction passing through the surface center CP of the feed element 121. Accordingly, a current distribution in the ground electrode of the antenna module 100#1 is shaped like a distorted ellipse having a minor axis along the Y-axis direction. In the antenna module 100A of Embodiment 1, by contrast, the peripheral electrodes 150A are placed at the positions that are symmetrical with respect to the polarization direction and the direction orthogonal to the polarization direction. Accordingly, it is observed that a current distribution in the ground electrode is closer to a true circle, compared with Comparative example 1, and that symmetry of currents is improved.

Thus the symmetrical placement of the peripheral electrodes electrically connected to the ground electrode enables suppression of the electric lines of force that are generated between the radiation element and the ground electrode and that go around onto the back surface and improvement in the symmetry of the electric lines of force even if the area of the ground electrode cannot be made sufficiently large, compared with the radiation element, and/or even if the ground electrode is asymmetrical with respect to the polarization direction passing through the surface center of the feed element. Thus, the deterioration in the antenna characteristics on condition that the size and/or shape of the ground electrode is restricted can be suppressed.

(Modification)

Figure 9:
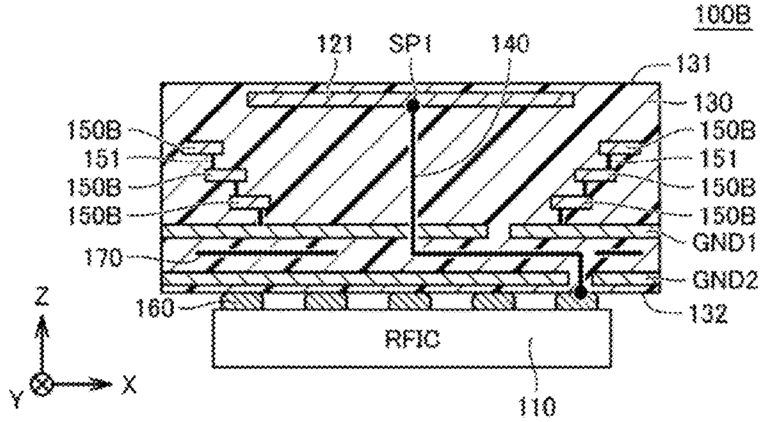
FIG. 9 is a diagram illustrating a first modification of placement of the peripheral electrodes.

FIG. 9 is a diagram (perspective side view) illustrating a first modification of placement of the peripheral electrodes. In an antenna module 100B of FIG. 9, placement of the peripheral electrodes with respect to the direction of the lamination is different compared with the antenna module 100 illustrated in FIG. 3. In the antenna module 100B, more specifically, the closer to the ground electrode GND1 a dielectric layer where a peripheral electrode 150B is formed is, the more inside in the dielectric substrate 130 the peripheral electrode 150B is placed. In other words, the peripheral electrodes 150B are placed so as to get close to the feed element 121 with approximation to the ground electrode GND1, in plan view from the normal direction with respect to the dielectric substrate 130.

In such a configuration as well, the degree of the coupling between the feed element 121 and the ground electrode GND1 can be increased, so that the antenna characteristics can be improved. Further, dielectrics surrounded by the feed element 121, the ground electrode GND1, and a conductor wall of the peripheral electrodes 150B are reduced in amount, compared with the configuration of the antenna module 100 illustrated in FIG. 2, so that electrostatic capacity between the feed element 121 and the ground electrode GND1 is decreased. Thus increase in the frequency band width of radiated radio waves is enabled.

Figure 10:
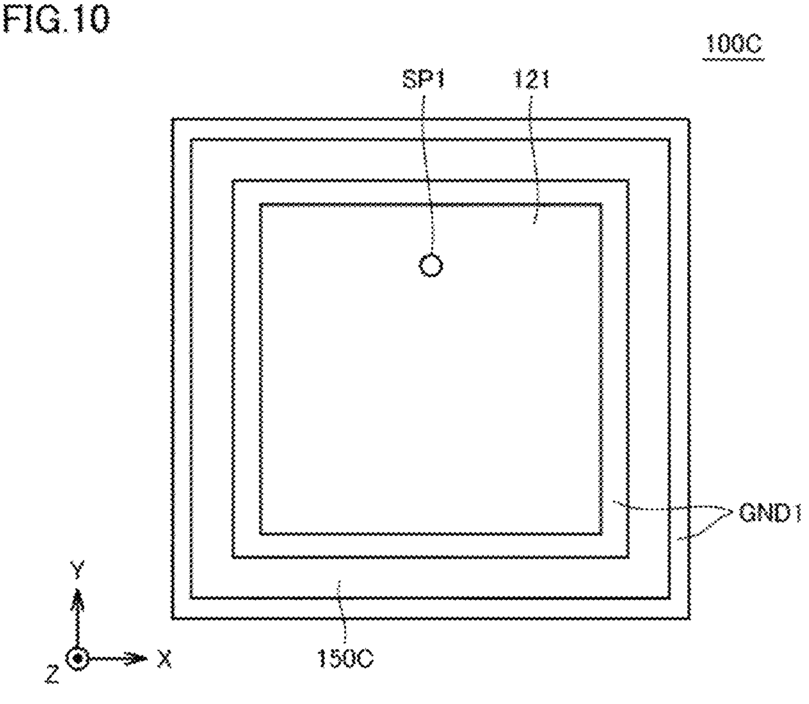
FIG. 10 is a diagram illustrating a second modification of placement of the peripheral electrodes.

FIG. 10 is a diagram (plan view) illustrating a second modification of placement of the peripheral electrodes. In an antenna module 100C of FIG. 10, compared with the antenna module 100 illustrated in FIG. 2, a peripheral electrode 150C is placed so as to form a loop around the feed element 121. By such a shape of the peripheral electrode as well, the electric lines of force that go around onto the back surface side are suppressed and the symmetry of the electric lines of force can be improved, because the peripheral electrode is placed at positions that are symmetrical with respect to the polarization direction and the direction orthogonal to the polarization direction. Accordingly, the antenna characteristics can be improved.

Embodiment 2

In Embodiment 1, the configuration in which the radiation element is singularly provided has been described. In Embodiment 2, a configuration in which peripheral electrodes are used in an array antenna provided with a plurality of radiation elements will be described.

Figure 11:
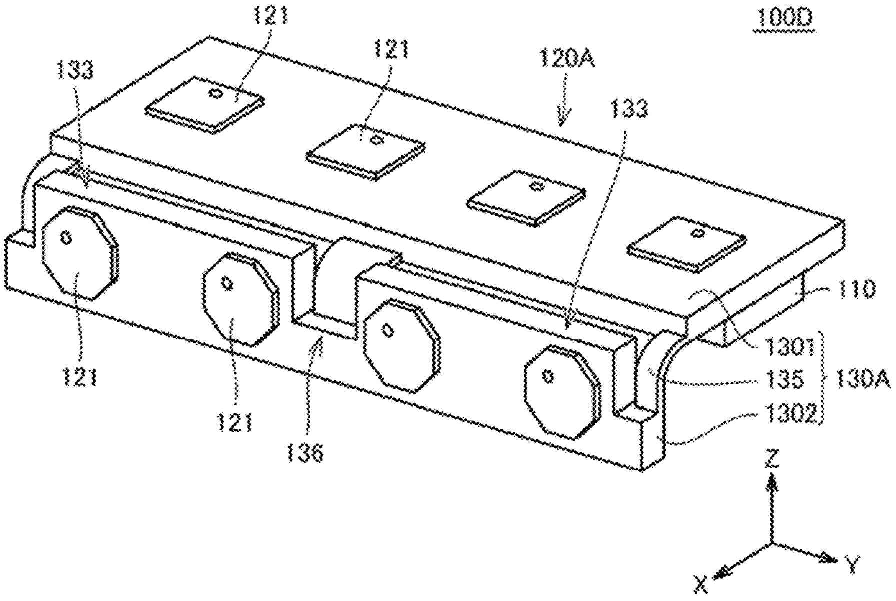
FIG. 11 is a perspective view of an antenna module according to Embodiment 2.

FIG. 11 is a perspective view of an antenna module 100D according to Embodiment 2. In reference to FIG. 11, an antenna device 120A of the antenna module 100D is an array antenna in which a plurality of feed elements 121 are placed on a dielectric substrate 130A substantially shaped like a letter L.

The dielectric substrate 130A includes a first substrate 1301 and a second substrate 1302 that differ in the normal direction each other and that are tabular and curving portions 135 to connect the first substrate 1301 and the second substrate 1302.

The first substrate 1301 is a rectangular flat plate having the normal direction along the Z-axis direction and has four feed elements 121 arrayed thereon along the Y-axis direction. The RFIC 110 is placed on a back surface side of the first substrate 1301.

The second substrate 1302 is a flat plate having the normal direction along the X-axis direction and has four feed elements 121 arrayed thereon along the Y-axis direction. In the second substrate 1302, cutout portions 136 are formed in portions to be connected to the curving portions 135 and protruding portions 133 that protrude in the positive direction along the Z axis from the cutout, portions 136 are formed. At least a portion of each of the feed elements 121 arrayed on the second substrate 1302 is formed on the protruding portions 133.

Such a configuration is used for an instrument that is shaped like a thin plate, such as a smartphone for instance, and that radiates radio waves in two directions from a main surface side and a side surface side. In the antenna module 100D, the first substrate 1301 corresponds to the main surface side and the second substrate 1302 corresponds to the side surface side. On the second substrate 1302 placed on the side surface side in this configuration, the ground electrode GND1 having a sufficient area may not be ensured due to a restriction on a dimension of the instrument along a direction of thickness that is, the Z-axis direction. Additionally, the cutout portions 136 for connection to the curving portions 135 make the shape of the ground electrode GND1 asymmetrical with respect to the polarization direction passing through the surface center of each of the feed elements 121 and further make the shape of the ground electrode GND1 different for each of the feed elements 121. Then the antenna characteristics of the feed elements 121 of the array antenna become heterogeneous and thus the characteristics of the entire array antenna may be deteriorated.

In Embodiment 2, therefore, the antenna characteristics of the plurality of feed elements forming the array antenna are homogenized by application of such peripheral electrodes as described in Embodiment 1 to the array antenna, so that the antenna characteristics of the entire array antenna are improved.

Figure 12:
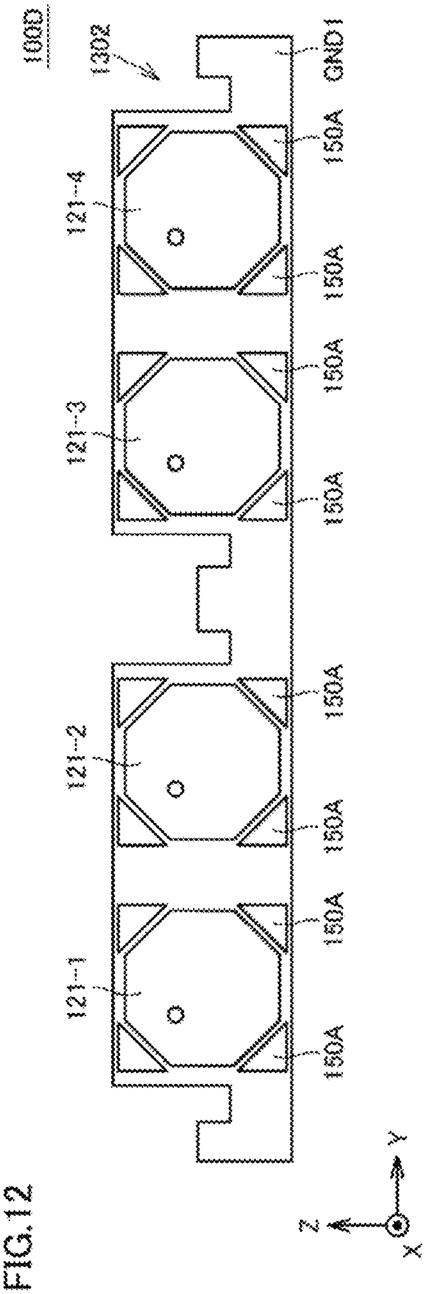
FIG. 12 is a plan view of a second substrate on condition that the antenna module of FIG. 11 is seen from the X-axis direction.

FIG. 12 is a plan view of the second substrate 1302 on condition that the antenna module 100D of FIG. 11 is seen from the X-axis direction. In FIG. 12, the dielectric layers are omitted. The feed elements 121 placed on the second substrate 1302 have a configuration similar to the antenna module 100A described in the second example of Embodiment 1.

More specifically, each of the feed elements 121 has the feeding point SP1 (that is, the polarization direction) placed with a tilt, of 45° with respect to the Z axis and further has an octagonal shape resulting from deletion of four corners. The peripheral electrodes 150A are placed at positions facing sides of the feed element 121 that extend along the polarization direction and sides thereof that extend along the direction orthogonal to the polarization direction and in layers between the feed element 121 and the ground electrode GND1. With such a configuration, the antenna characteristics can be homogenized by the peripheral electrodes even if a variation among the ground electrodes corresponding to the feed elements is brought about by restrictions on the sizes and/or shapes of the ground electrodes.

Figure 13:
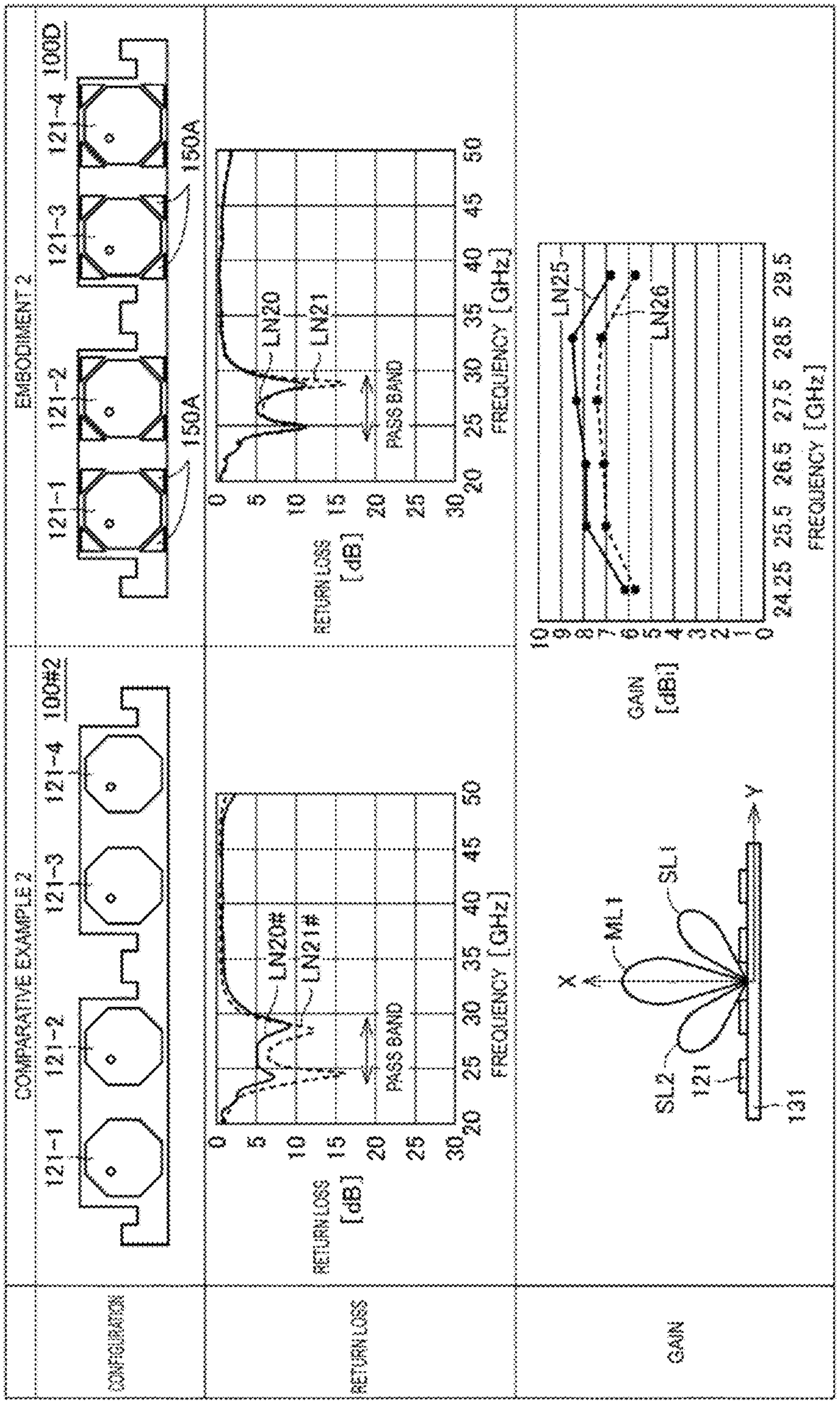
FIG. 13 is a diagram for illustration of antenna characteristics in accordance with the presence or absence of the peripheral electrodes in Embodiment 2.

FIG. 13 is a diagram for illustration of differences in the antenna characteristics in accordance with the presence or absence of the peripheral electrodes in such an array antenna illustrated in FIG. 11 and FIG. 12. In FIG. 13, results of simulations with a portion made of the second substrate 1302 in the antenna module 100D of Embodiment 2 and an antenna module 100#2 of Comparative example 2 in which the peripheral electrodes 150A are not provided are illustrated. In FIG. 13, return losses in two adjoining feed elements 121-1 and 121-2 are illustrated in middle sections and antenna gains with radiation of radio waves from four feed elements 121-1 to 121-4 are illustrated in bottom sections.

With regard to the return losses, solid lines LN20 and LN20# denote the feed element 121-1 and dashed lines LN21 and LN21# denote the feed element 121-2. With regard to the antenna gains, peak gains of a main lobe ML1 among the main lobe ML1 and side lobes SL1 and SL2 of radio waves radiated in the X-axis direction are illustrated. Regarding the antenna gains, a solid line LN25 denotes the antenna module 100D of Embodiment 2 and a dashed line LN26 denotes the antenna module 100#2 of Comparative example 2.

In the antenna module 1002 of Comparative example 2, in reference to FIG. 13, frequencies that decrease the return losses and a frequency band width that attains a specified return loss are slightly deviated between the two feed elements. That is, the two adjoining feed elements have different antenna characteristics. In the antenna module 100D of Embodiment 2, by contrast, the two adjoining feed elements are substantially identical in the frequencies that decrease the return losses and the frequency band width and variations in the antenna characteristics are decreased.

It is thus observed that the antenna module 100D (solid lines LN25) of Embodiment 2 is larger in the antenna gains in a pass band as well, compared with the antenna module 100#2 (dashed line LN26) of Comparative example 2, and improves the antenna characteristics.

As described above, the placement of the peripheral electrodes at the positions that are symmetrical with respect to the polarization direction and/or the direction orthogonal to the polarization direction for each of the radiation elements enables decrease in the variations in the antenna characteristics among the radiation elements and improvement in the antenna characteristics of the entire antenna module, even if the sizes and/or shapes of the ground electrodes with respect to the radiation elements are restricted in the antenna module in which the array antenna is formed.

(Modification 1)

In the antenna module 100D of Embodiment 2 illustrated in FIG. 11 and FIG. 12, the configuration in which the peripheral electrodes are individually provided for each of the adjoining feed elements has been described. In Modification 1, a configuration in which the antenna characteristics are further improved by commonality of the peripheral electrodes for the adjoining feed elements in an array antenna will be described.

Figure 14:
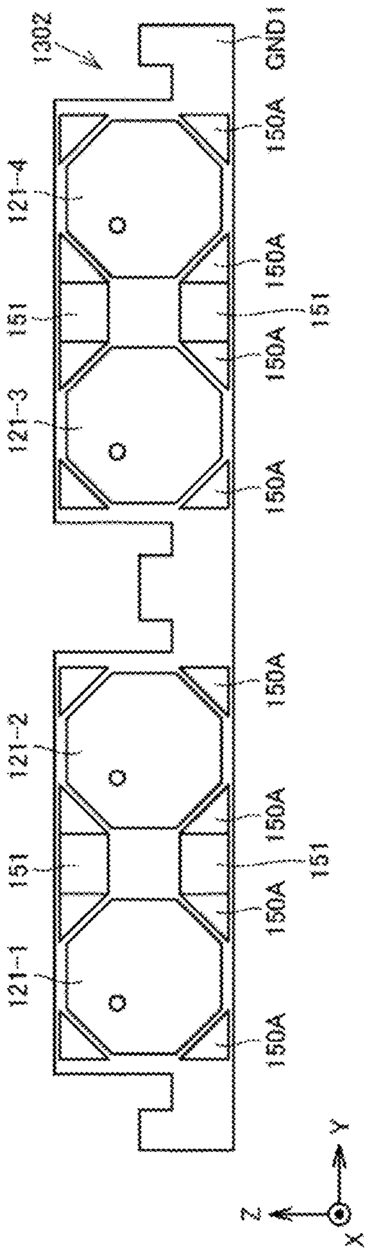
FIG. 14 is a plan view of an antenna module of Modification 1.

FIG. 14 is a plan view of an antenna module 100D1 according to Modification 1. In the antenna module 100D1, the peripheral electrodes 150A between the feed element 121-1 and the feed element 121-2 and the peripheral electrodes 150A between the feed element 121-3 and the feed element 121-4 are electrically connected and integrated by connection electrodes 151. The peripheral electrodes 150A and the connection electrodes 151 may be integrally formed instead of being made of individual elements connected.

Thus the commonality of the adjoining peripheral electrodes increases an area of the peripheral electrodes that receives the electric lines of force emitted from the feed elements and therefore enables suppression of the electric lines of force that go around onto the back surface of the ground electrode GND1. As a result, the deterioration in the antenna characteristics such as deterioration in the antenna gains, narrowing of the frequency band width, or the variation in the polarization direction can be further suppressed.

Though the commonality of some of the peripheral electrodes may deteriorate symmetry of a distribution of the electric lines of force in each feed element, sizes, shapes, and/or the like of the peripheral electrodes provided with no commonality may be appropriately adjusted in such a case.

(Modification 2)

In Modification 1, a configuration in which the peripheral electrodes for the adjoining feed elements are integrated by the separate connection electrodes has been described.

Figure 15:
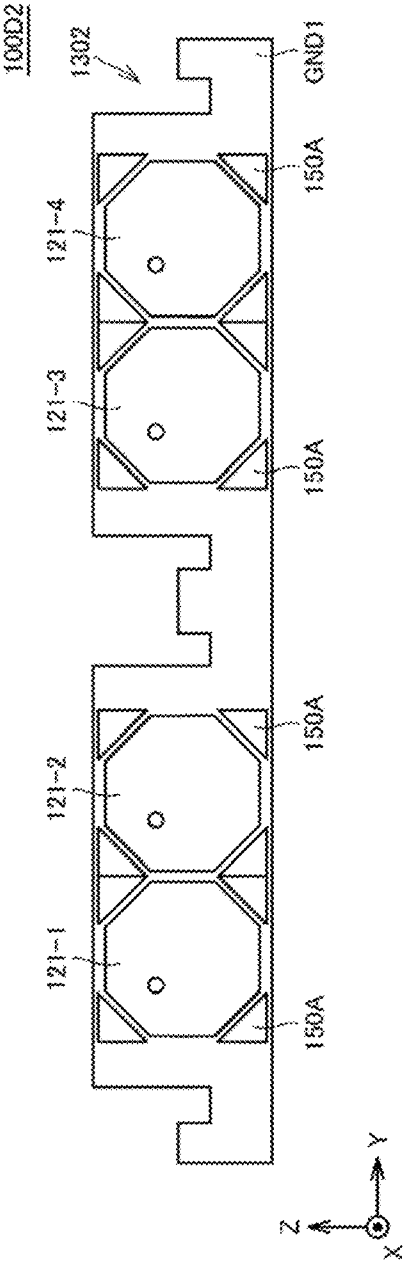
FIG. 15 is a plan view of an antenna module of Modification 2.

An antenna module 100D2 of Modification 2 illustrated in FIG. 15 has a configuration in which the feed element 121 are placed so that the peripheral electrodes 150A themselves are brought into contact with each other without use of the connection electrodes 151 of FIG. 14 and in which coupling and the commonality of the adjoining peripheral electrodes 150A are attained. In the antenna module 100D2 of FIG. 15 as well, the area of the peripheral electrodes that receives the electric lines of force emitted from the feed elements is increased and therefore the deterioration in the antenna characteristics such as the deterioration in the antenna gains, the narrowing of the frequency band width, or the variation in the polarization direction can be further suppressed.

Embodiment 3

In Embodiment 1 and Embodiment 2, the configurations in which radio waves having the single polarization direction are radiated from one radiation element have been described. In Embodiment 3, an example of a configuration with application of the peripheral electrodes to a so-called dual-polarization antenna module in which radio waves having two different polarization directions can be radiated from one radiation element will be described.

Figure 16:
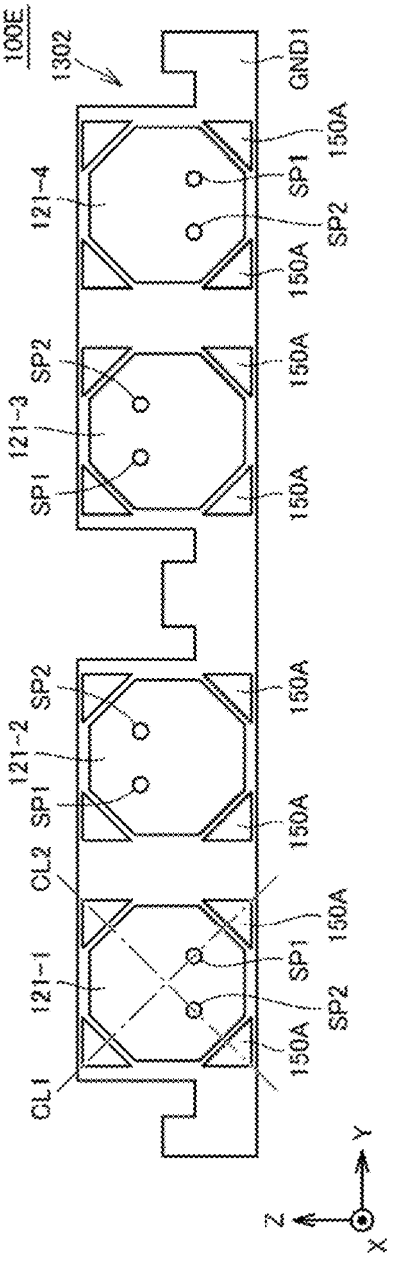
FIG. 16 is a plan view of an antenna module according to Embodiment 3.

FIG. 16 is a plan view of an antenna module 100E according to Embodiment 3. The antenna module 100E is an array antenna similar to the antenna module 100D of Embodiment 2 but differs in that two feeding points SP1 and SP2 are provided for each of the feed elements 121-1 to 121-4. When radio frequency signals are fed to the feeding point SP1 of each of the feed elements 121-1 to 121-4, radio waves having a polarization direction along a direction (direction in which a chain line CL2 extends) that is tilted by 45° in the negative direction along the Y axis with respect to the Z axis are radiated. When radio frequency signals are fed to the feeding point SP2, radio waves having a polarization direction along a direction (direction in which a chain line CL2 extends) that is tilted by 45° in the positive direction along the Y axis with respect to the Z axis are radiated.

The feed element 121-2 is placed so as to be turned by 180° with respect to the adjoining feed element 121-1. The feed element 121-4 is placed so as to be turned by 180° with respect to the adjoining feed element 121-3. Radio frequency signals having inverted phases are fed to identical feeding points of the feed elements that are placed so as to be turned by 180° with respect to each other. The phases of the radio waves radiated from each feed element and having each polarization direction can be made to coincide by such phase adjustment. Further, cross polarization discrimination (XPD) can be improved by placement of the feed elements, placed so as to adjoin, with turning by 180°.

In the antenna module 100E as well, the peripheral electrodes 150A are placed at the positions that are symmetrical, with respect to the polarization direction and the direction orthogonal to the polarization direction, for each of the feed elements 121-1 to 121-4. Thus the variations in the antenna characteristics among the feed elements that are associated with the restrictions on the size and/or shape of the ground electrode GND1 can be decreased and the antenna characteristics of the entire antenna module can be improved.

Figure 17:
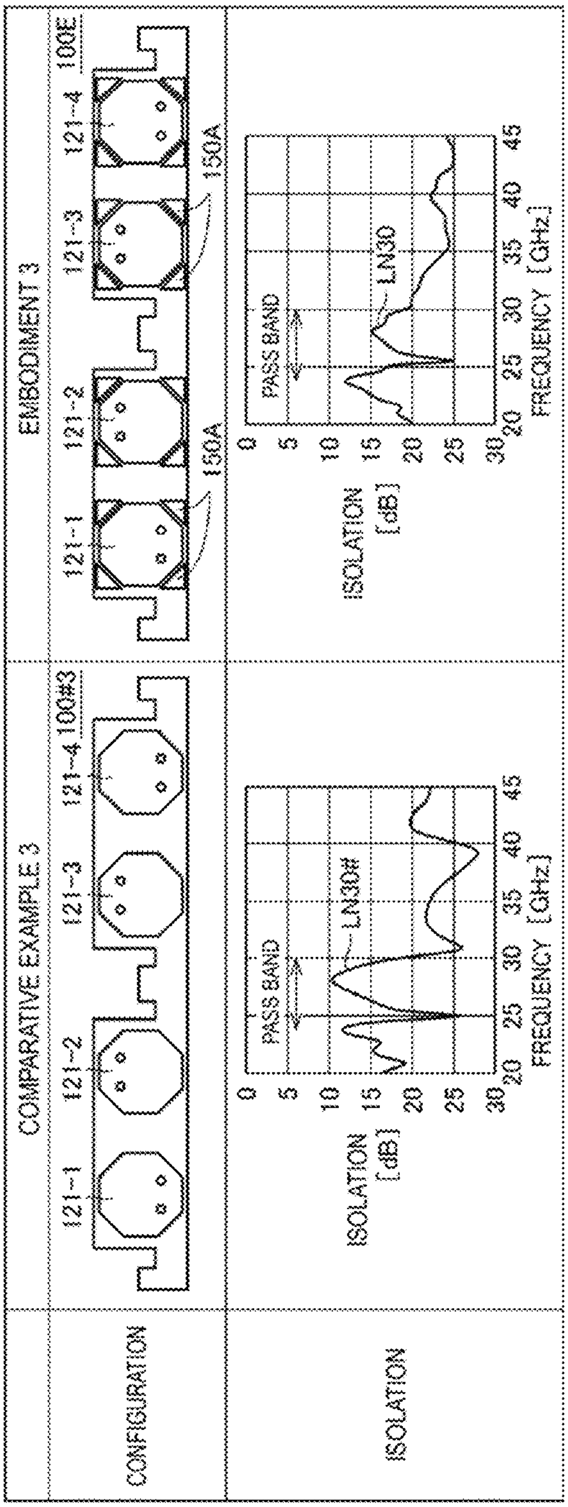
FIG. 17 is a diagram for illustration of isolation of two polarizations in accordance with the presence or absence of the peripheral electrodes in Embodiment 3.

FIG. 17 is a diagram for illustration of isolation of two polarizations in accordance with the presence or absence of the peripheral electrodes in the dual-polarization antenna module. In FIG. 17, results of simulations of isolation between two feeding points in the antenna module 100E of Embodiment 3 and an antenna module 100#3 of Comparative example 3 in which the peripheral electrodes 150A are not provided are illustrated. As evident from FIG. 17, in a desired pass band, the isolation in the antenna module 100E of Embodiment 3 is improved compared with the isolation in the antenna module 100#3 of Comparative example 3. Improvement in the isolation between the two polarizations results in improvement in the return losses and the gains and further leads to improvement in active impedance.

In the dual-polarization antenna module as well, as described above, the antenna characteristics can be improved, even in presence of restrictions on the ground electrode, by the placement of the peripheral electrodes at the positions that are symmetrical with respect to the polarization direction and/or the direction orthogonal to the polarization direction for each of the radiation elements.

Though the example in which the peripheral electrodes are applied to the dual-polarization array antenna has been described in above description, the peripheral electrodes may be applied to the dual-polarization antenna module having a single radiation element as described in Embodiment 1.

Embodiment 4

In the embodiments described above, the configurations in which the radio waves radiated from the radiation elements have a single frequency band have been described. In Embodiment 4, a configuration with application of such peripheral electrodes as described above to a so-called dual-band antenna module In which radio waves having two different frequency bands can be radiated from each radiation element will be described.

Figure 18:
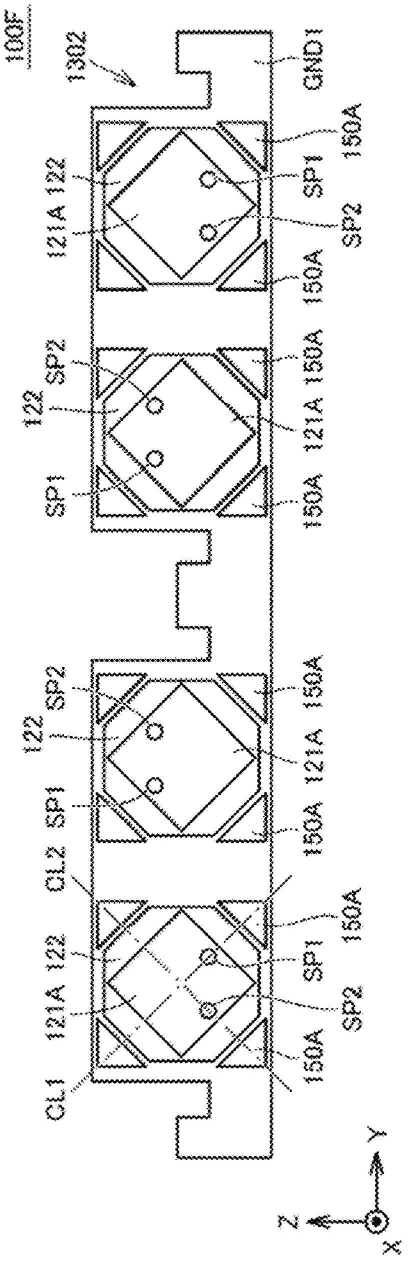
FIG. 18 is a plan view of an antenna module according to Embodiment 4.

FIG. 18 is a plan view of an antenna module 100F according to Embodiment 4. The antenna module 100F is a dual-polarization array antenna as with Embodiment 3 but differs in that passive elements 122 are provided in addition to feed elements 121A, as radiation elements.

The passive elements 122 are placed in layers between the feed elements 121A and the ground electrode GND1. Feeder wiring from the RFIC 110 is connected through the passive elements 122 to the feeding points SP1 and SP2 of the feed elements 121A. A dimension of the passive elements 122 in the polarization direction is greater than a dimension of the feed elements 121A in the polarization direction. Accordingly, a resonant frequency of the passive elements 122 is lower than a resonant frequency of the feed elements 121A. Feeding of radio frequency signals corresponding to the resonant frequency of the passive elements 122 causes the passive elements 122 to radiate radio waves that are lower in frequency band than from the feed elements 121A. That is, the antenna module 100F is the dual-band antenna module capable of radiating radio waves having two different frequency bands.

The feed elements 121A and the passive elements 122 are placed so that the polarization direction is tilted by 45° with respect to the Z-axis direction, due to the restriction on the size of the ground electrode GND1. Further, the passive elements 122 have an octagonal shape resulting from deletion of four corner portions that protrude from the ground electrode GND1.

Herein, the feed elements 121A on a higher-frequency side function as antennas by way of electromagnetic field coupling with the passive elements 122. Meanwhile, the passive elements 122 function as antennas by way of electromagnetic field coupling with the ground electrode GND1. For the ground electrode GND1, as with Embodiment 2 and Embodiment 3, a sufficient area is not ensured with respect to the passive elements 122 and a shape that is asymmetrical with respect to the polarization direction passing through a surface center of a passive element 122 is further provided.

In the antenna module 100F, therefore, the peripheral electrodes 150A are placed at positions facing sides of the passive elements 122 that extend along the polarization direction and sides thereof that, extend along the direction orthogonal to the polarization direction and in layers between the passive elements 122 and the ground electrode GND1. Thus the variations in the antenna characteristics among the passive elements 122 can be decreased and the antenna characteristics of the entire antenna module can be improved.

In the antenna module 100F, though an example of a configuration in which the feed elements and the passive elements are provided as the radiation elements has been described, both the two radiation elements may be feed elements.

(Modification 3)

Figure 19:
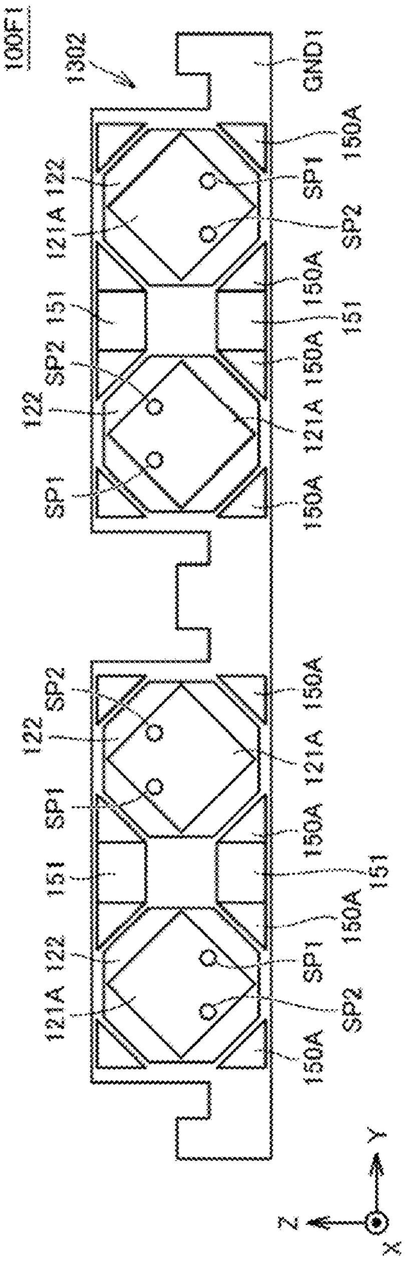
FIG. 19 is a plan view of an antenna module of Modification 3.

FIG. 19 is a plan view of an antenna module 100F1 according to Modification 3. In the antenna module 100F1 of Modification 3, as with Modification 1 described in FIG. 14, the coupling and commonality among the peripheral electrodes 150A for adjoining radiation elements in the antenna module 100F1 are attained by the connection electrodes 151. By such a configuration, electric lines of force emitted from the passive elements 122 and going around onto the back surface of the ground electrode GND1 can be suppressed, so that the deterioration in the antenna characteristics can be further suppressed, compared with the antenna module 100F of Embodiment 4.

(Modification 4)

Figure 20:
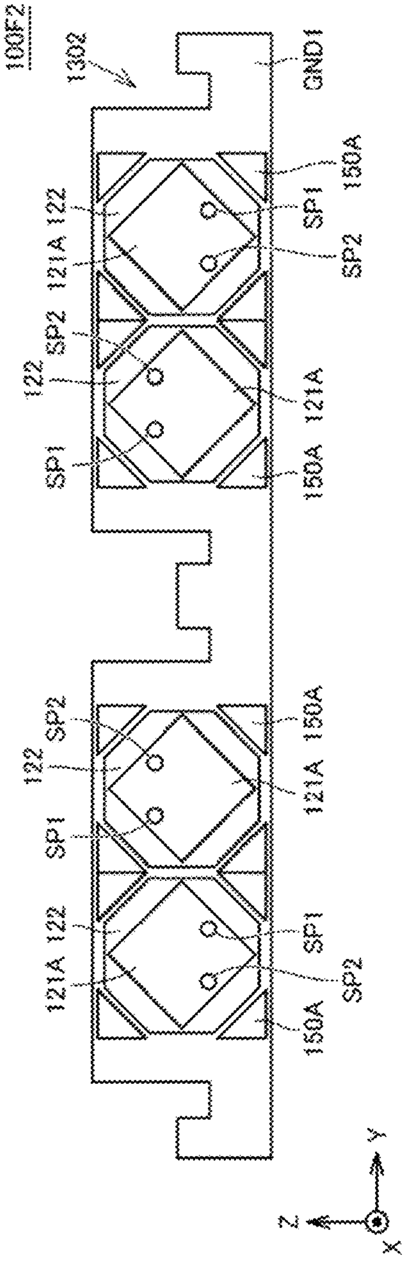
FIG. 20 is a plan view of an antenna module of Modification 4.

FIG. 20 is a plan view of an antenna module 100F2 according to Modification 4. As with Modification 2 described in FIG. 16, the antenna module 100F2 of Modification 4 has a configuration in which the feed elements 121A are placed so that adjoining peripheral electrodes 150A are brought into contact with each other and so that the commonality between the peripheral electrodes 150A is attained. In such a configuration as well, electric lines of force emitted from the passive elements 122 and going around onto the back surface of the ground electrode GND1 can be suppressed, so that the deterioration in the antenna characteristics can be further suppressed, compared with the antenna module 100F of Embodiment 4.

Embodiment 5

The area for the peripheral electrodes is preferably increased in order that the electric lines of force going around onto the back surface of the ground electrode may be suppressed with use of the peripheral electrodes. On the other hand, in case where other elements such as stubs or filters are formed in the dielectric substrate, a layout of those elements may be restricted by increase in the size of the peripheral electrodes.

In Embodiment 5, a configuration that may attain both ensuring of freedom of layout in the dielectric substrate and reduction in the electric lines of force going around onto the back surface of the substrate will be described.

Figure 21:
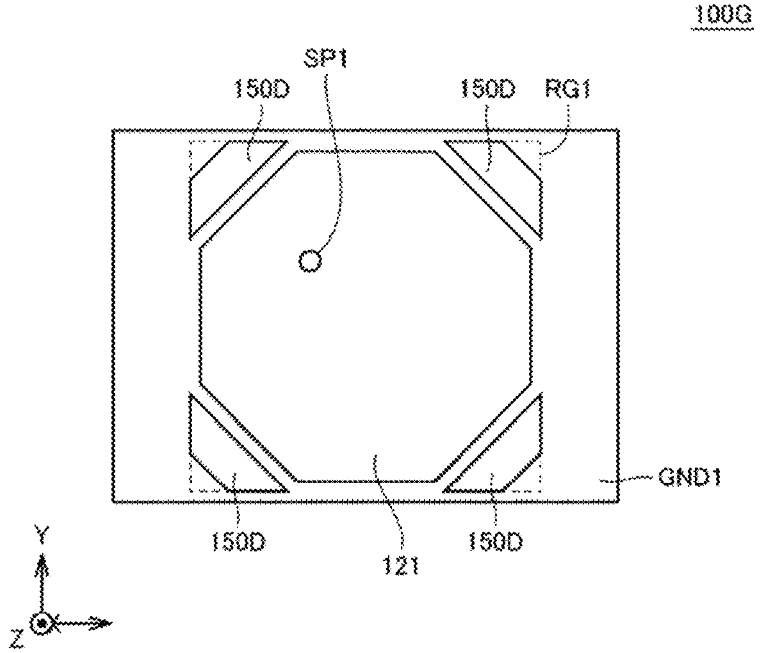
FIG. 21 is a plan view of an antenna module according to Embodiment 5.
Figure 22:
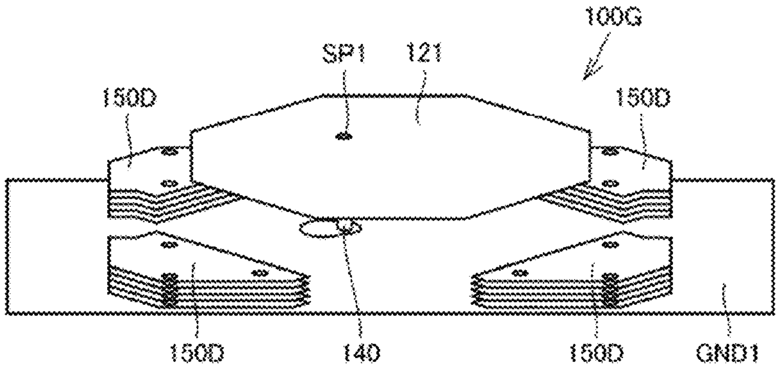
FIG. 22 is a perspective view of the antenna module of FIG. 21.

FIG. 21 and FIG. 22 are diagrams illustrating an antenna module 100G according to Embodiment 5. FIG. 21 is a plan view of the antenna module 100G and FIG. 22 is a perspective view of the antenna module 100G. In FIG. 21 and FIG. 22 as well, the dielectric layers are omitted for facilitation of description. In the antenna module 100G, peripheral electrodes 100D are provided in place of the peripheral electrodes 150A in the antenna module 100A described in the second example of Embodiment 1. In FIG. 21 and FIG. 22, description of elements that are common to the antenna module 100A illustrated in FIG. 6 and FIG. 7 will not be iterated.

In reference to FIG. 21 and FIG. 22, the peripheral electrodes 150D in the antenna module 150A are formed so as to have slightly smaller sizes than the peripheral electrodes 150A illustrated in FIG. 6 and FIG. 7. More specifically, the peripheral electrodes 150A are each substantially shaped like the right triangle in plan view of the dielectric substrate, whereas an example of the peripheral electrodes 150D of Embodiment 5 is substantially shaped like a trapezoid that results from removal of a portion (egion RG1 of dashed lines in FIG. 21) of a vertex portion having a right angle of the right triangle described above. Such alteration in the shape and size reduction of the peripheral electrodes enable expansion of spaces on the dielectric substrate where other elements may be placed.

Figure 23:
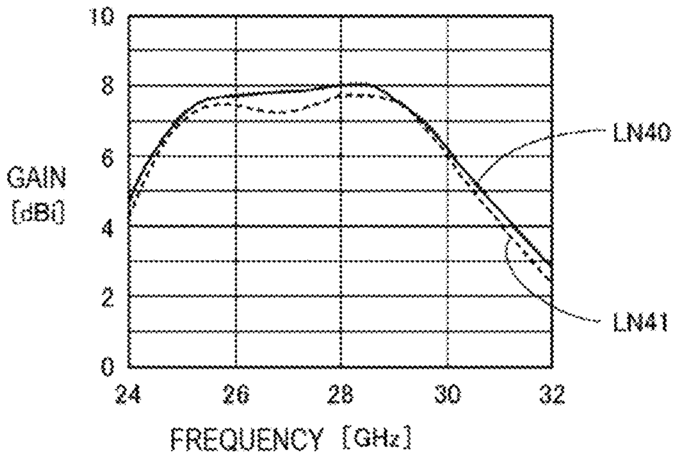
FIG. 23 is a diagram for illustration of gain characteristics of the antenna module of Embodiment 5.

With use of FIG. 23 and FIG. 24, subsequently, antenna characteristics of the antenna module 100G of Embodiment 5 will be described in comparison with the antenna characteristics of the antenna module 100A. FIG. 23 illustrates frequency characteristics in antenna gain and FIG. 24 illustrates directivity.

In FIG. 23, the frequency characteristics are of the antenna gains on condition that the pass band has a center frequency of 28 GHz. In FIG. 23 and FIG. 24, solid lines LN40 and LN50 denote a case with the antenna module 100A and dashed lines LN41 and LN51 denote a case with the antenna module 100G.

As illustrated in FIG. 23, the site of the peripheral electrodes of the antenna module 100G of Embodiment 5 is reduced compared with the antenna module 100A and the antenna module 100G is slightly lower in the antenna gain than the case with the antenna module 100A in general. In the intended pass band (25 GHz to 29.5 GHz), however, the antenna gains higher than or equal to 7 dBi are ensured throughout the band.

Figure 24:
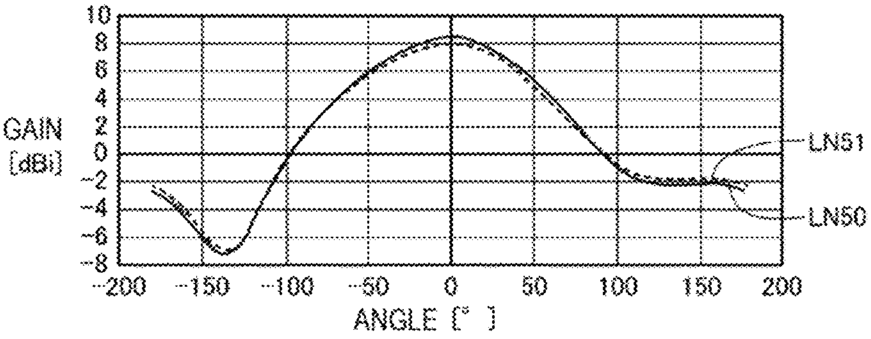
FIG. 24 is a diagram for illustration of directivity of the antenna module of Embodiment 5.

A graph of FIG. 24 illustrates the directivity on condition that radio waves with the center frequency of 28 GHz are radiated and angles from the normal direction of the feed element 121 with respect to a section along the polarization direction are represented on a horizontal axis. In comparison of the peak gains at the angle of 0°, it is observed that the case with the antenna module 100G attains the peak gain of 8 dBi, which is about 0.2 dBi lower compared with the case with the antenna module 100A.

In a region with the angles greater than 100° and a region with the angles less than −100°, the gains of the antenna module 100G are slightly greater than the gains of the antenna module 100A. This indicates enhancement of going around onto the back surface of the dielectric substrate. That is, the case with the antenna module 100G attains the directivity within a targeted specification range in general, though exhibiting a slight reduction, compared with the antenna module 100A.

As described above, the antenna module 100G of Embodiment 5 is slightly inferior in the antenna characteristics to the antenna module 100A illustrated in FIG. 6 but is capable of improving the antenna characteristics, compared with cases in which no peripheral electrodes are used. On the other hand, the freedom of layout in the dielectric substrate can be improved by the reduction in the size of the peripheral electrodes.

Which of the configuration of the antenna module 100A and the configuration of the antenna module 100G is to be adopted is appropriately selected in accordance with the required antenna characteristics and presence or absence of elements to be provided in the antenna module.

Embodiment 6

In the embodiments and modifications that have been described above, the configurations in which the radiation elements and the ground electrode are placed on the same dielectric substrate have been described. The radiation elements, however, may have a configuration in which the radiation elements are formed on a dielectric substrate differing from a dielectric substrate where the other elements are formed.

Figure 25:
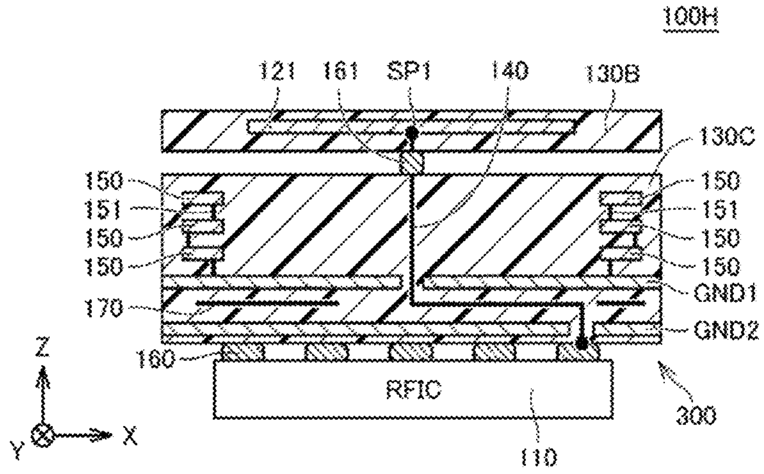
FIG. 25 is a perspective side view of an antenna module according to Embodiment 6.

FIG. 25 is a perspective side view of an antenna module 100H according to Embodiment 6. The antenna module 100H has a configuration in which the feed element 121 in the antenna module 100 illustrated in FIG. 3 for Embodiment 1 is formed in or on a dielectric substrate 130*b* and in which elements other than the feed element 121 are formed in or on a circuit board 300 independent from the dielectric substrate 130B. In the circuit board 300, the elements other than the feed element 121 in the antenna module 100 of FIG. 3 are placed in or on a dielectric substrate 130C and the RFIC 110 is mounted on a bottom surface side of the dielectric substrate 130C.

A bottom surface of the dielectric substrate 130B is placed so as to face a top surface of the dielectric substrate 130C in the circuit board 300. The feeder wiring 140 is connected to the feed element 121 through a connection terminal 161 placed between the dielectric substrate 130B and the dielectric substrate 130C. A solder bump, a connector, or a connecting cable is used as the connection terminal 161.

Thus freedom of instrument placement in a communication device can be increased by the configuration in which the circuit board to be provided with the RFIC and the dielectric substrate to toe formed with the radiation element are formed as separate substrates. For instance, a configuration in which the circuit board is placed on a motherboard and in which the radiation element are placed in a casing may be adopted.

It is to be understood that the embodiments disclosed herein are exemplary in all respects and are not restrictive. A scope of the present disclosure is intended to be designated by the claims instead of the description of embodiments described above and to encompass all modifications within purport and a scope that are equivalent to the claims.

REFERENCE SIGNS LIST

10 communication device
100, 100A to 100H, 100D1, 100D2, 100F1, 100F2 antenna module
110 RFIC

111A to 111D, 113A to 113D, 117 switch
112AR to 112DR low-noise amplifier
112AT to 112DT power amplifier
114A to 114D attenuator
115A to 115D phase shifter
116 signal synthesizer/branching filter
118 mixer
119 amplifier circuit
120, 120A antenna device
121, 121A feed element
122 passive element
130, 130A to 130C dielectric substrate
131 top surface
132 bottom surface
133 protruding portion
135 curving portion
136 cutout portion
140 feeder wiring
150, 150A to 150D peripheral electrode
151 connection electrode
155 via
160 solder bump
161 connection terminal
170 wiring pattern
200 BBIC
300 circuit board
1301 first substrate
1302 second substrate
CP surface center
GND, GND1, GND2 ground electrode
ML1 main lobe
SL1, SL2 side lobe
SP1, SP2 feeding point

The invention claimed is:

1. An antenna module comprising:
a dielectric substrate including a plurality of dielectric layers that are laminated;
a radiation element disposed in or on the dielectric substrate and configured to radiate radio waves in a first polarization direction;
a ground electrode that is positioned to face the radiation element; and
peripheral electrodes that are arranged in a plurality of layers between the radiation element and the ground electrode and that are electrically connected to the ground electrode, wherein
the peripheral electrodes are symmetrically positioned with respect to at least one of a first direction parallel to the first polarization direction or a second direction orthogonal to the first polarization direction.

2. The antenna module according to claim 1, wherein
from a plan view from a normal direction with respect to the dielectric substrate, and a free space wavelength of the radio waves radiated from the radiation element being defined as $\lambda_o$, a shortest distance from a surface center of the radiation element to an end portion of the ground electrode along the first polarization direction is smaller than $\lambda_o/2$.

3. The antenna module according to claim 1, wherein
from a plan view from a normal direction with respect to the dielectric substrate, the ground electrode has a shape that is asymmetrical with respect to a polarization direction passing through the center of the radiation element.

4. The antenna module according to claim 2, wherein
from the plan view, the ground electrode has a shape that is asymmetrical with respect to a polarization direction passing through the center of the radiation element.

5. The antenna module according to claim 1, wherein
the radiation element is also configured to radiate radio waves in a second polarization direction that differs from the first polarization direction.

6. The antenna module according to claim 2, wherein
the radiation element is also configured to radio waves in a second polarization direction that differs from the first polarization direction.

7. The antenna module according to claim 3, wherein
the radiation element is also configured to radiate radio waves in a second polarization direction differing from the first polarization direction.

8. The antenna module according to claim 1, wherein
the radiation element includes
a first element that faces the ground electrode and that is configured to radiate radio waves in a first frequency band, and
a second element that, is disposed in a layer between the first element and the ground electrode and that is configured to radiate radio waves in a second frequency band that is lower in frequency than the first frequency band.

9. The antenna module according to claim 2, wherein
the radiation element includes
a first element that faces the ground electrode and that is configured to radiate radio waves in a first frequency band, and
a second element that is disposed in a layer between the first element and the ground electrode and that is configured to radiate radio waves in a second frequency band that, is lower in frequency than the first frequency band.

10. The antenna module according to claim 3, wherein
the radiation element includes
a first, element that faces the ground electrode and that is configured to radiate radio waves in a first frequency band, and
a second element that is disposed in a layer between the first element and the ground electrode and that is configured to radiate radio waves in a second frequency band that is lower in frequency than the first frequency band.

11. The antenna module according to claim 1, wherein
from a plan view from a normal direction with respect to the dielectric substrate, the peripheral electrodes are substantially loop-shaped and positioned to surround the radiation element.

12. The antenna module according to claim 1, wherein
from a plan view from a normal direction with respect to the dielectric substrate, the peripheral electrodes are each substantially shaped as a right triangle having a hypotenuse facing a side along the first direction or a side along the second direction of the radiation element.

13. The antenna module according to claim 1, further comprising:
a feed circuit configured to feed radio frequency signals to each of the radiation elements.

14. A communication device comprising:
the antenna module according to claim 1.

15. An antenna module comprising:

a dielectric substrate including a plurality of dielectric layers that are laminated;

a first, radiation element and a second radiation element that are disposed in or on the dielectric substrate and that are positioned so as to adjoin each other;

a ground electrode that is positioned to face the first radiation element and the second radiation element; and peripheral electrodes that are arranged in a plurality of layers between the first radiation element and the ground electrode and a plurality of layers between the second radiation element and the ground electrode and that are electrically connected to the ground electrode, wherein the peripheral electrodes are symmetrically positioned with respect to at least one of a first direction parallel to a polarization direction of radiated radio waves or a second direction orthogonal to the polarization direction, for each of the first radiation element and the second radiation element.

16. The antenna module according to claim 15, wherein coupling and commonality exist between a first peripheral electrode positioned for the first radiation element and a second peripheral electrode positioned for the second radiation element and adjoining the first peripheral electrode.

17. The antenna module according to claim 16, wherein from a plan view from a normal direction with respect to the dielectric substrate, the first peripheral electrode and the second peripheral electrode are each substantially shaped as a right triangle having a hypotenuse facing a side along the first direction or a side along the second direction of each of the first radiation element and the second radiation element.

18. The antenna module according to claim 15, further comprising:

a feed circuit configured to feed radio frequency signals to each of the radiation elements.

19. A communication device comprising:

the antenna module according to claim 15.

20. A circuit board comprising:

a dielectric substrate including a plurality of dielectric layers that are laminated;

a ground electrode that is positioned to face a radiation element that radiates a radio wave in a first polarization direction in response to being fed a radio frequency signal; and peripheral electrodes that are arranged in a plurality of layers between the radiation element and the ground electrode and that are electrically connected to the ground electrode, wherein the peripheral electrodes are symmetrically positioned with respect to at least one of a first direction parallel to the first polarization direction and a second direction orthogonal to the first, polarization direction.

* * * * *